T. J. BLACK.
VEHICLE TOP CONSTRUCTION.
APPLICATION FILED JULY 19, 1913.
1,114,673.
Patented Oct. 20, 1914.
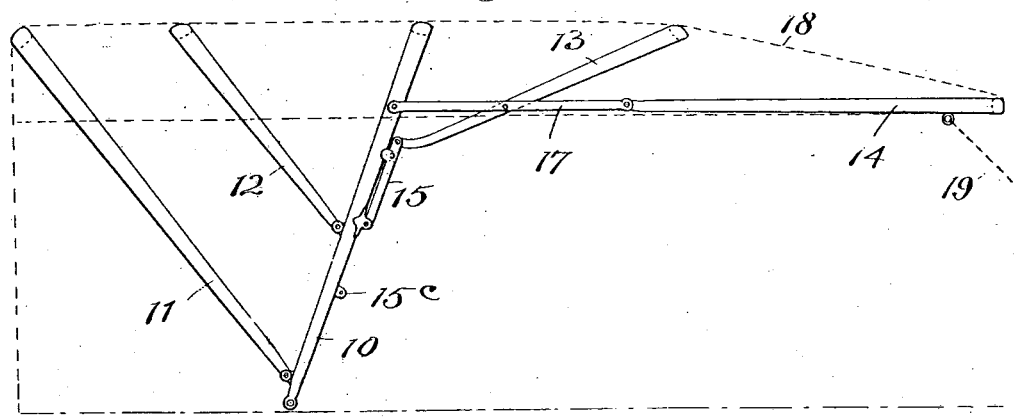
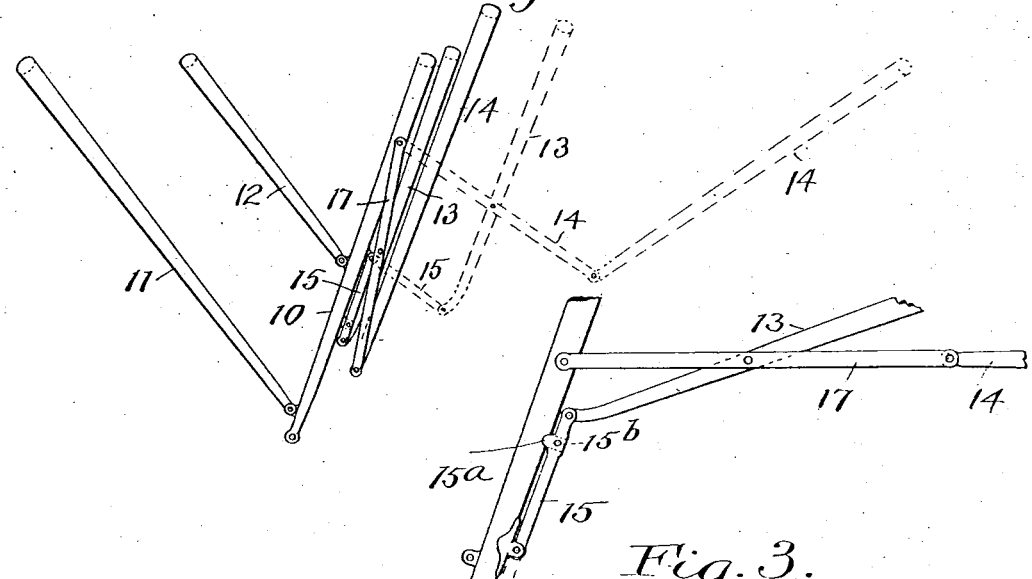
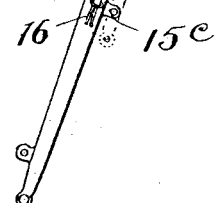
Witnesses
E. B. Gilchrist
L. D. Porter
Inventor
Thomas J. Black.
By Thurston & Kivus
attys

UNITED STATES PATENT OFFICE.

THOMAS J. BLACK, OF CLEVELAND, OHIO, ASSIGNOR TO THE CLEVELAND HARDWARE COMPANY, OF CLEVELAND, OHIO, A CORPORATION OF OHIO.

VEHICLE TOP CONSTRUCTION.

1,114,673.  Specification of Letters Patent.  Patented Oct. 20, 1914.

Application filed July 19, 1913. Serial No. 779,925.

*To all whom it may concern:*

Be it known that I, THOMAS J. BLACK, a citizen of the United States, residing at Cleveland, in the county of Cuyahoga and State of Ohio, have invented a certain new and useful Improvement in Vehicle Top Construction, of which the following is a full, clear, and exact description.

This invention relates to a vehicle top construction and has for its principal objects to provide a top which can be easily collapsed or extended, and the manipulation of which does not require the services of more than one person.
Still further, the invention aims to provide a top which has the characteristics above stated, and which when extended is sufficiently rigid to meet all the requirements of the trade, and which can be folded compactly when the top is collapsed or clashed.

My invention may be briefly summarized as consisting in certain novel details of construction and combinations and arrangements of parts which will be described in the specification and set forth in the appended claims.

In the accompanying sheet of drawings wherein I have shown the preferred embodiment of my invention, Figure 1 is a side view of the top with the cover shown by dotted lines; Fig. 2 is a similar view with part of the construction collapsed or with certain portions folded together into the relative positions which they occupy when the top is collapsed; and Fig. 3 is a slightly enlarged side view of a part of the construction.

Referring now to the drawings, it will be seen that the top construction includes a main bow 10 which may be pivotally connected to the sides of the vehicle, preferably near the rear end thereof, a rear bow 11, and an auxiliary rear bow 12, both of which are pivotally connected to the main bow, as shown. The main bow is in nearly vertical position when the top is extended, being forwardly inclined somewhat, and the rear bows 11 and 12 are both inclined rearwardly and are substantially parallel.
It will be understood by the expression "bow" that I mean to cover what is commonly included in the trade by the word bow, i. e., the arched wooden portion which extends about the top proper or cover, and sockets or bars which are secured to the ends of the arched or wooden parts, and which constitute in effect the lower ends of the bows. It will be observed further that the construction includes a forwardly inclined bow 13, which is inclined forwardly at a greater angle than the main bow 10, and extends out from the latter at a decided angle thereto. The construction includes lastly, as far as the bows are concerned, a fifth bow 14 which is the so-called front bow, and extends in nearly horizontal position around the front and rearwardly from the front for a distance along the sides of the top.

The main part of my invention resides in that part of the construction which includes the bows 10, 11 and 14, and the manner of attaching or connecting together these parts, the construction being a modification and furtherance of the invention as described in Letters Patent of the United States to David E. Vanderveer, No. 1,065,010, dated June 17th, 1913, for vehicle top construction, wherein two bow members, including the main and forwardly inclined bow are connected together by a link which is adapted to swing about its pivotal connection with the main bow from an upper position substantially parallel thereto to a lower position substantially parallel thereto, so as to admit of easy and quick collapsing of the top. In the present construction, I have utilized this link feature of the Vanderveer construction, and have embodied that feature by a novel arrangement of parts in a top commonly called a one-man top, which as before stated, is of the construction which does not require the services of two persons in manipulating the same.

Referring again to the drawings, it will be observed that the main bow 10 and the forwardly inclined bow 13, are pivotally connected together by a link 15, which when the top is either collapsed or extended, lies substantially parallel to the main bow 10. This link is pivoted at one end to the lower rear end of the inclined bow 13, and at its opposite end is pivotally connected to the main bow at a point about midway between the top and bottom thereof. When the top is extended, a U-shaped clip or jaw 15ᵃ of the link embraces the main bow so as to hold the parts of the construction against relative lateral movement, and when the top is collapsed, a socket or recess of the link shown by dotted lines at 15ᵇ in Fig. 3 receives a lug 15ᶜ on the main bow, and is adapted to be fastened thereto by a cotter pin or other suitable removable device 16, which is adapted to be extended through alined openings in the lug, and in the side walls of the socket 15ᵇ.

It will be observed that the rear portion of the front bow 14 is supported by a link or rod 17, to the forward end of which the end of bow 14 is pivotally connected, and which is substantially in alinement with the front bow 14, when the top is extended. This link or rod 17 at its rear end is pivotally connected to the main bow, and about midway between its end is pivotally connected to the front inclined bow 13. This construction gives great rigidity and renders the collapsing of the top a very simple matter, for if the bow 14 is swung upwardly so as to elevate the forward end of the rod 17, the upward swinging movement of the point of connection between the rod 17 and the bow 13, swings the link 15 outwardly, and when the latter passes beyond the position of alinement with the bow 13, all the parts drop by gravity to the position shown in Fig. 2.

It will be understood that the construction shown in the drawings will be the same on both sides of the top, and it will be understood further that the parts above described will be used in connection with a suitable cover or top proper, which is illustrated by dotted lines at 18. It may be said further that when the top is extended, the front part of the front bow 14 is held from sagging by the cover 18, which is found to be ample for the purpose stated, although if desired, any suitable means, such as a stop hinge or sleeve may be provided at the joint between the parts 14 and 17, to prevent the part 14 moving downwardly beyond the horizontal or beyond the position of alinement with the part 17.

With this construction, I prefer to employ the usual front straps 19 which extend from the front portion of the top downwardly to some part of the vehicle. These straps hold the parts in the assembled relationship shown, and especially do they hold the link 15 firmly against the main bow 10.

Having thus described my invention, what I claim is:

1. In combination in a vehicle top construction, a main bow, an extension bow, a link connecting the latter to the main bow and being at an angle to the extension bow and substantially parallel to the main bow when the top is extended, means whereby the end of the extension bow is braced by the main bow against movement relative thereto when the top is extended, a second extension bow, and means connecting the latter to the first named extension bow and to the main bow.

2. In combination in a vehicle top construction, a main bow, an extension bow, a link connecting the extension bow to the main bow, said link being alongside and substantially parallel to the main bow when the top is extended or collapsed and the outer portion of the link having a bracing connection with the main bow when the top is extended, a second extension bow, and means connecting the same to the first named extension bow and to the main bow.

3. In combination in a vehicle top construction, a main bow, an extension bow, a link connecting the extension bow to the main bow, said link being alongside and substantially parallel to the main bow and having a part adjacent the extension bow engaging the main bow when the top is extended, a second extension bow, and means connecting the latter to the main bow said means being connected between its ends to the first named extension bow.

4. In combination in a vehicle top construction, a main bow, an extension bow, a link connecting the latter to the main bow and being alongside and substantially parallel to the main bow when the top is extended, means whereby the outer portion of the link and the end portion of the extension bow are braced by the main bow against movement relative thereto; a second extension bow, and a link connected to the latter and to the first named extension bow and main bow.

In testimony whereof, I hereunto affix my signature in the presence of two witnesses.

THOMAS J. BLACK.

Witnesses:
L. I. PORTER,
A. F. KWIS.